July 11, 1933.     C. B. BAILEY     1,917,214
GASKET
Filed June 19, 1930
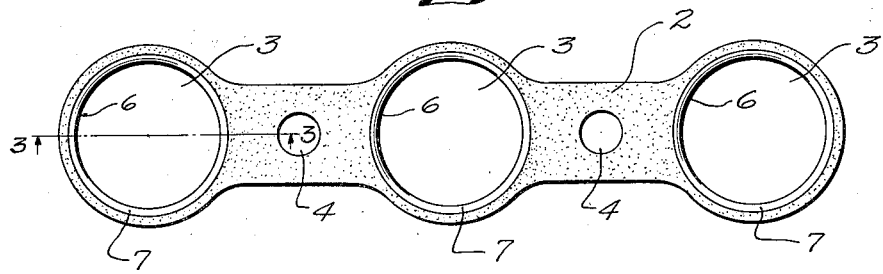
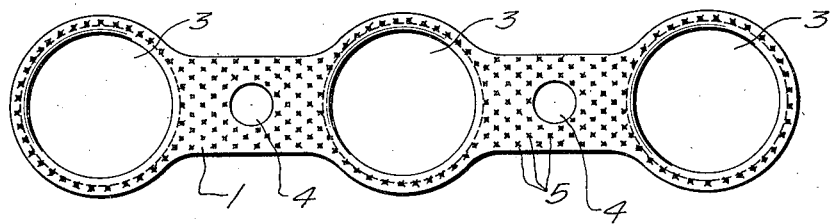
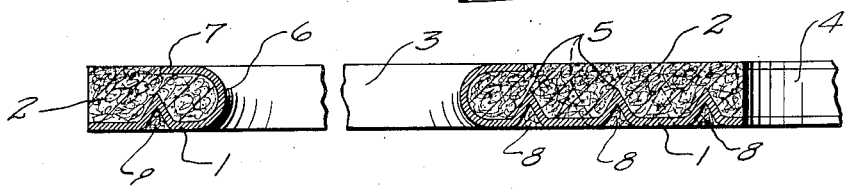
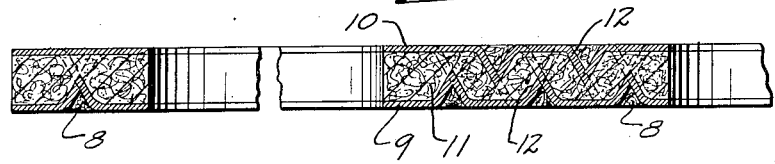
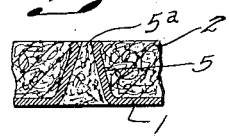
INVENTOR.
CLAUDE B BAILEY.
BY
ATTORNEYS.

Patented July 11, 1933

1,917,214

UNITED STATES PATENT OFFICE

CLAUDE B. BAILEY, OF WYANDOTTE, MICHIGAN, ASSIGNOR TO McCORD RADIATOR & MFG. CO., OF DETROIT, MICHIGAN, A CORPORATION OF MAINE

GASKET

Application filed June 19, 1930. Serial No. 462,202.

This invention relates to gaskets, and more particularly to gaskets of the type which are used in the automotive industry as cylinder head gaskets, manifold gaskets and the like.

One object of my invention is to provide a gasket structure which can be made cheaper and with less material than heretofore required for gaskets of this type.

Another object of my invention is to provide a gasket which due to its construction is less apt to blow out and disintegrate in service because the packing material employed, instead of being held in place by a clamping pressure at a comparatively few places, is more securely held in position on its metal supporting layer at a multiplicity of points or places distributed over the entire surface of the supporting layer about and between the port holes and other openings therein.

A further object of my invention is to provide the anchoring or securing means between the packing layer and the metal layer in the form of projections extending outward from one of the layers and engaging in the other.

A further object of my invention is to provide these projections as struck out members from the metal layer, thereby allowing the packing layer to be readily and easily applied to the metal layer by simply pressing the packing material either in paste or sheet form onto the metal layer, the projections taking into the packing layer and anchoring it to the metal layer throughout the entire supporting surface thereof.

Another object of my invention is to provide the metal layer on one of the exposed sides of the gasket so as to be in contact with the member against which the gasket is clamped, and thus secure effective thermal contact between the gasket and said member to transfer the heat from the latter.

A further object of my invention is to have the packing layer exposed on the side of the gasket opposite to the metal layer so as to provide a relatively soft cushion which may be imbedded into the interstices of the contacting member to hold the gasket in place and secure a more effective seal.

The invention consists further in the matters hereinafter described and claimed.

In the accompanying drawing:

Fig. 1 is a top plan view of a gasket constructed in accordance with my invention;

Fig. 2 is a bottom plan view of the same;

Fig. 3 is an enlarged cross-sectional view taken on line 3—3 of Fig. 1; and

Figs. 4 and 5 show modified forms of construction to be hereinafter described.

As shown in Figs. 1 to 3 of the drawing, the gasket comprises two layers 1, 2 of sheet material. These layers are coextensive and fit one on the other, and are cut or blanked out in the form for the particular gasket desired. In the drawing, I have shown the gasket in the form of a manifold gasket, having three port holes, 3, 3, spaced apart lengthwise of the gasket body, with stud or bolt holes 4, 4 between the port holes. The port holes are of substantially the same diameter, and in the gasket shown, the connecting portions between the port holes are of less width than the diameter of the latter to reduce the cost of manufacture and the amount of material used. This may be done in a manifold gasket because the portions between the port holes are merely required to connect the port holes together and hold them in substantially the same plane. Of course, the connecting portions could extend out to the edges of the port hole provided portions, and in a cylinder head gasket this would be done.

The layer 1 is preferably made of sheet metal such as brass, copper, zinc, aluminum, or the like, and while of relatively thin gauge, is sufficiently thick enough to provide a support for the layer 2 which is preferably made of asbestos or other desired relatively resilient non-metallic packing material. Such material serves as the cushion for the gasket to make the seal and has refractory properties when the gasket is subject to high temperatures as when used in association with the cylinder block of an internal combustion engine.

The metal layer 1 is provided on one side with a multiplicity of sharp projections 5, 5, preferably being formed by indenting the metal of the layer, and projecting the same out of the plane of the layer as shown in Fig. 3. These projections may take any desired form, cones with pointed ends being shown in the drawing. These extend into the packing layer 2 when the latter is pressed onto the same in the making of the gasket, or the sheet from which the gasket is cut. The projections 5 serve as anchoring means to hold the layers from displacement in the plane of each other, and also to maintain the packing layer in place on the metal layer, as illustrated in Fig. 3. With the projections 5 relatively small and distributed over the entire surface of the metal layer both about the port and stud holes and also in the connecting portions between the port holes, the gasket is provided with an exceedingly large number of anchoring members, which engage the packing layer and hold it on the metal layer without unduly puncturing the packing layer to destroy its continuity as an integral layer.

The construction described is a simple one, and inexpensive to produce. After the metal layer in sheet form 1 has been provided with its projections, the material forming the packing layer is spread in moist paste form over the metal layer to the desired thickness and is then forced with sufficient pressure by the use of rolls or dies onto the metal layer to embed the projections into the packing material to secure the same to the metal layer. Sufficient pressure is employed to seat the packing material against the metal layer at and about the bases of the projections as shown in Fig. 3. This is an exceedingly simple operation and considerably reduces the cost of manufacture of the gasket and the amount of material required. Instead of applying the packing material in paste form, it may be applied in sheet form, the two layers (metal and packing) being pressed together to embed the projections in the packing layer as before. In Figs. 1 to 3 of the drawing, the apexes of the cones 5 are shown as closed. In practice the apexes would tear through in the making of the cones, and thus sharp edges would be produced which edges would penetrate the packing and under pressure be bent over to clinch the packing to the metal layer, as shown at 5ª in Fig. 5.

As an additional means for binding the layers together, I provide flanges 6 on the metal layer about each of the port holes 3 therein, and have these flanges extend through the registering holes in the layers, and are bent back on the packing as at 7, in Fig. 3. The marginal portions 7 of the flanges are preferably pressed down into the body of the packing so as to lie flush with the outer surface thereof as shown in Fig. 3. This construction not only serves to clamp the layers together at the port holes, but also forms a protective metal covering or binding for the packing to prevent blow-outs and deterioration of the same. With the flanges 6 connected to or carried by the metal layer, the heat to which they are subjected is transferred to the metal layer, and dissipated from the exposed edges or other portions thereof.

In Figs. 1 to 3, the metal layer 1 forms one face of the gasket and the packing layer 2 the other face. This gives the gasket a metal face for thermal contact with one of the members between which the gasket is clamped. The other face being formed by the packing provides a relatively soft cushion which when the gasket is clamped in place takes into the interstices of the opposed surface and provides an effective seal.

This face of the gasket may be covered with a coating of graphite to prevent undue sticking of the packing against a metal surface. The pockets or recesses formed in the exposed face of the metal layer 1 by the cones 5 are filled with asbestos or other packing, as at 8, to prevent leakage when the gasket is clamped in place.

In Fig. 4, I show a gasket composed of three layers, 9, 10, and 11. The outer layers 9, 10 are of sheet metal, and the intermediate layer is of asbestos or other desired packing material. Each metal layer has projections 12, 12, the same as before. These projections extend into the packing layer and anchor it to the metal layers as shown in Fig. 4.

The details of structure and arrangement of parts shown and described may be variously changed and modified without departing from the spirit and scope of my invention.

I claim as my invention:

1. A gasket comprising superimposed layers of metallic and non-metallic cushion material, said layers being coextensive and having registering openings, said metallic layer being provided with a multiplicity of struck out projections distributed thereover and extending to an appreciable extent into the cushion material for securing the same to the metallic layer, said projections being conical in shape to provide them with pointed outer ends to facilitate their entry into the cushion material on pressing the layers together in the making of the gasket and to provide the projections with rounded bases adjacent their connection with the metallic layer to resist bending of the projections under such pressure and to provide the projections with surrounding walls extending a substantially uniform distance from the metal layer to resist relative shifting of the layers in the plane of the gasket under such pressure and when secured together.

2. A gasket comprising superimposed layers of metallic and non-metallic cushion material, said layers being coextensive and having registering openings, said metallic layer forming one face of the gasket and the cushion layer forming the opposite face of the gasket, said metallic layer having a multiplicity of struck out projections distributed there over and extending to an appreciable extent into the cushion layer for securing the layers together, said projections being conical in shape to provide them with pointed outer ends to facilitate their entry into the cushion layer on pressing the layers together in the making of the gasket and to provide the projections with rounded bases adjacent their connection with the metallic layer to resist bending of the projections under such pressure and to provide the projections with surrounding walls extending a substantially uniform distance from the metal layer to hold the layers against relative shifting in the plane of the gasket under such pressure and when secured together.

In testimony whereof I affix my signature.

CLAUDE B. BAILEY.